United States Patent [19]

Guy et al.

[11] E Re. 30,823

[45] Reissued Dec. 15, 1981

[54] OFFSHORE PLATFORM

[75] Inventors: Arthur L. Guy, Harris County, Tex.; John B. Reber, Jr., Los Angeles County, Calif.

[73] Assignee: Exxon Production Research Company, Houston, Tex.

[21] Appl. No.: 758,519

[22] Filed: Jan. 11, 1977

Related U.S. Patent Documents

Reissue of:

[64] Patent No.: 3,859,806
Issued: Jan. 14, 1975
Appl. No.: 402,661
Filed: Oct. 1, 1973

U.S. Applications:

[63] Continuation-in-part of Ser. No. 286,374, Sep. 5, 1972, abandoned.

[51] Int. Cl.[5] ..... E02D 21/00; B63B 35/40

[52] U.S. Cl. ..... 405/204; 114/77 R; 285/286

[58] Field of Search ..... 61/96, 97, 110; 114/77, 114/254

[56] References Cited

U.S. PATENT DOCUMENTS

| | | | |
|---|---|---|---|
| 2,422,168 | 6/1947 | Kirby | 61/87 |
| 2,857,744 | 10/1958 | Swiger et al. | 61/87 |
| 3,186,180 | 6/1965 | Swanlund, Jr. et al. | 61/96 |
| 3,407,771 | 10/1968 | Takezawa et al. | 114/77 |
| 3,641,774 | 2/1972 | Hekkanen | 61/96 |

*Primary Examiner*—Jacob Shapiro
*Attorney, Agent, or Firm*—John S. Schneider

[57] ABSTRACT

A method for joining two or more jacket or substructure components of an offshore platform in the water to form a single jacket unit. An offshore platform is located in deep water by dividing a jacket or support of extensive length therefor into at least two sections which have only sufficient buoyancy to float at water surface when the sections are launched from at least a vessel at a selected location. The sections are aligned and connected together. Guide means ensure proper alignment of the legs of the sections. Access tubes from the surface of the water to the hollow legs permit direct internal welding in securing the legs of the sections together. The sections are then sunk at the selected location until the jacket is in an upright position at which point it is anchored by driving piling through the jacket's hollow legs into the sea floor, following which the deck of the platform is placed or stabbed on the anchored jacket.

12 Claims, 17 Drawing Figures

FIG. 10.
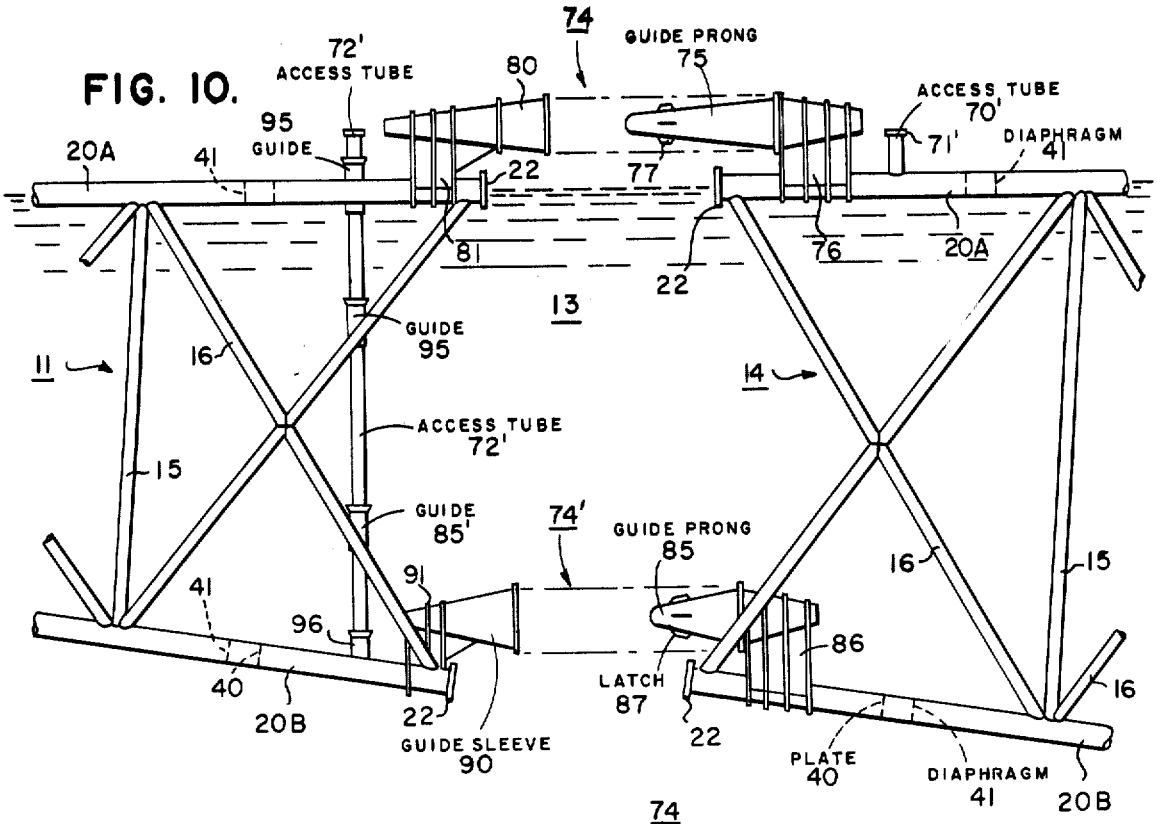
FIG. 11.
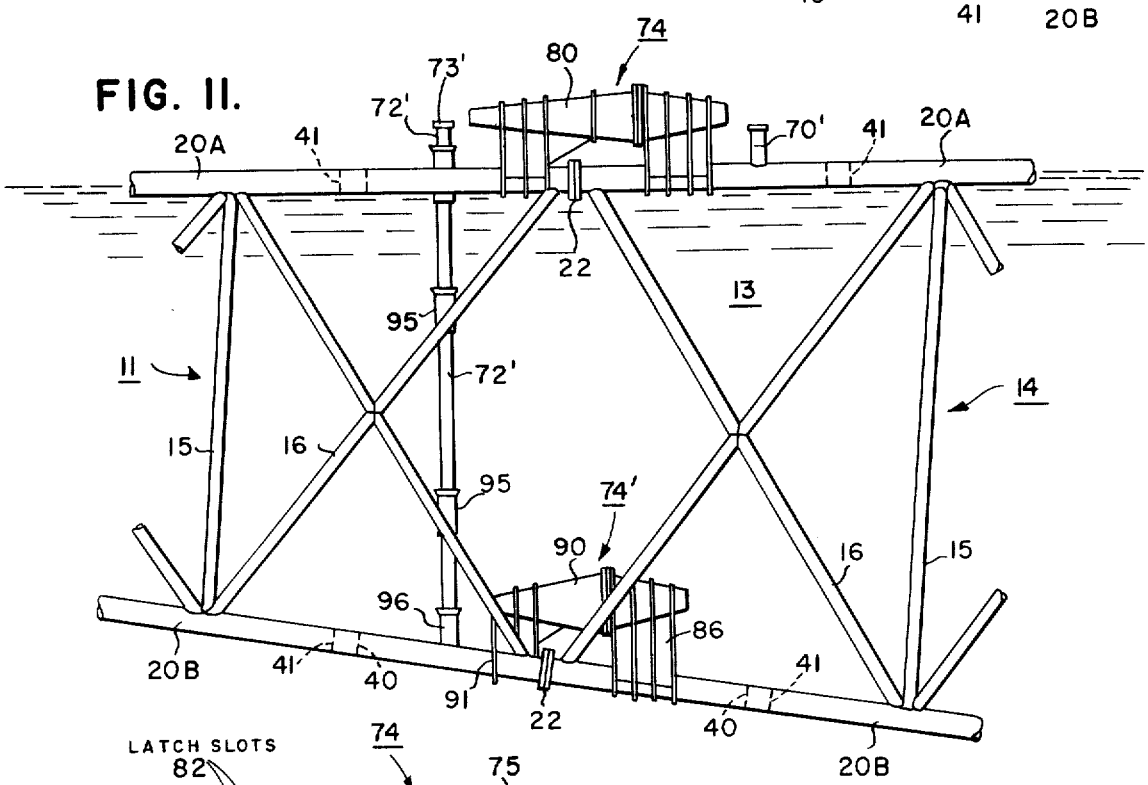
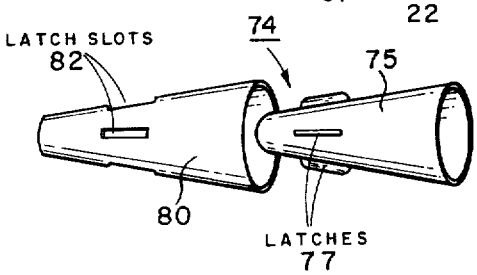
FIG. 12.

96
98
99
20B
72'
97
14
11
16
22

OFFSHORE PLATFORM

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 286,374 entitled "Offshore Platform Location" filed Sept. 5, 1972 by Arthur L. Guy et al and now abandoned.

BACKGROUND OF THE INVENTION

1. Field of the Invention

The present invention is directed to offshore structures which are fabricated at a point remote from the point where they are ultimately located. More particularly, the invention is concerned with a method and apparatus for unitizing an offshore jacket of extensive length for an offshore platform and locating same at a selected location. In its more specific aspects, the invention is directed to method and apparatus for use in extremely deep waters where an offshore platform is supported for various purposes such as, but not limited to, well drilling, production of oil and gas, storage of oil and the like, and supporting navigational aids and the like.

2. Description of the Prior Art

It has been known for many years that structures may be located in deep waters by making the structures buoyant and floating them to a selected location in a body of water either in an assembled or non-assembled condition. To accomplish this, however, where heavy seas may be encountered and long tows may be necessary, excess buoyancy, as much as 35 percent or more, must be built into the structure, which for a platform jacket or support in waters of 500, 750, 1000 feet or more may require flotation members each of which may be as large as a submarine.

It has also been known that flotation tanks may be added to sections of an offshore structure and the sections gradually added one on top of each other until the completed structure is above water level. Another possible method is to build an offshore structure close to land in shallow water or on land and add buoyant sections to it as the structure of increasing height is skidded or towed farther and farther to sea into deeper water until the desired location is reached.

It has been disclosed in the prior art that supporting members for offshore structures may be sealed by frangible or flexible (rupturable) diaphragms to maintain columns free of debris and to confer buoyancy thereto.

The art has also described the floating of an offshore structure to an offshore location on a barge and then launching it and sinking it at a selected point. This, too, is attendant with difficulties because the usual barge is only about 300 to 400 feet in length, and while larger barges may be built, the greater the length the greater are the problems therewith.

The art has, in addition, described fabricating an offshore structure at one location in sections, floating the sections on one or more vessels or barges, launching the sections into water at or near another location for positioning the offshore platform, aligning and connecting the sections together and then sinking the connected sections to form a support for a platform.

SUMMARY OF THE INVENTION

The present invention may be briefly described and summarized as involving a method for utilizing a sectional offshore jacket to support an offshore platform deck and locating the unitized jacket at a selected location. In the present invention, the jacket (or deck support) to be located in deep water is fabricated on shore or at a location remote from its ultimate position. Due to its extensive length which may range from 500 to 1500 or even more feet, the jacket is fabricated in a plurality of sections designed to interconnect with each other at sea and form a unitary structure. Each section of the jacket is provided with sufficient buoyance to float but insufficient buoyance to be practical for a long tow (say one of more than 100 miles) or one in rough seas. On launching a section it should be floating so that it is just awash but still may support workmen to install equipment for moving or pulling the sections together and to perform other tasks which may be necessary. A part of this pulling equipment may be preinstalled, but it may be removable after it has performed its designed service.

After the sections have been aligned and then moved or pulled together, the sections are fixedly connected together first by bolting and then by welding. Guide means ensure proper alignment of the legs of the sections prior to fastening such legs together. The legs of the sections are connectable together at both the water's surface and fully submerged. After the bolting of flanges the geometry of the sections form an internal habitat for welding the legs of the sections together. No outside cofferdam is needed at the water's surface or fully submerged to permit welding of the legs together. Conventional welding is conducted internally within the legs of the sections. Man-sized access tubes extend from above the surface of the water to each leg (at the water's surface and fully submerged) of either section adjacent the connection of the common leg of the sections to permit a welder(s) to enter each leg and weld the sections of each leg together from the interior of the joint thus connecting the sections together structurally at atmospheric pressure. Such a weld develops the full strength of the adjacent pipe sections. Then with the unitized jacket, without deck, floating horizontally, the pulling equipment may be removed and motor driven sea cocks connected to power means. The power means may be located on the jacket section or on a separate vessel as may be desired.

The sea cocks are opened and the unitized jacket rotates from horizontal to vertical as it sinks, the upper end being supported or lifted as flooding takes place by a crane on a barge or other vessel to ensure proper location. Thereafter pilings are driven through the hollow legs into water bottom and the unitized jacket is anchored. The crane then lifts and lowers or stabs a prefabricated deck having depending means into the open legs of the unitized jacket or other means provided to receive the supporting depending means from the platform. Thereafter, the deck may be used as desired for oil and/or gas production, storage, navigational aids, and the like.

BRIEF DESCRIPTION OF THE DRAWINGS

The present invention will be further described by reference to the drawings in which:

FIGS. 10 to 15 show the steps of connecting the jacket sections together using modified quick connection guide means and illustrating the manner in which the legs of the sections may be welded together.

DESCRIPTION OF THE PREFERRED EMBODIMENTS

Figure 1:
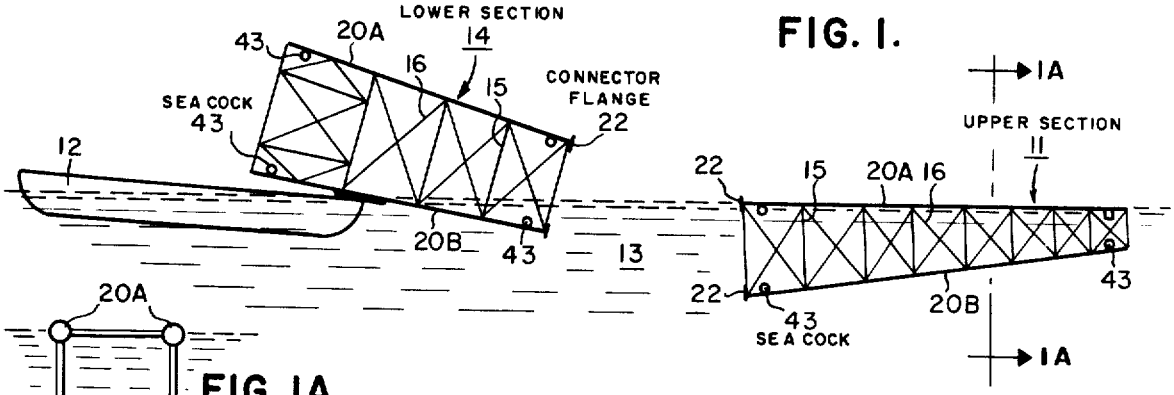
FIG. 1 is a side elevational view of a jacket in two sections in the course of launching.
Figure 1A:
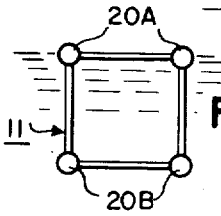
FIG. 1A is a cross-sectional view of the upper section taken on line 1A—1A.

Referring now to the drawing and particularly to FIG. 1, numeral 11 designates an upper jacket section for an offshore structure which has been launched from a barge or vessel such as 12 into a body of water 13 which may be, for example, 1,000 feet in depth but which may be from about 500 to about 1,500 feet or more deep. Numeral 14 designates a second jacket section (hereinafter referred to as the lower jacket section) which is designed to matingly engage with upper jacket section 11 and form a unitized jacket structure as will be described. The sections 11 and 14 are fabricated on shore or at a point remote from which they are launched to be connected together and have only sufficient buoyancy to float substantially awash, such that little excess buoyancy is provided. Therefore, due to the length of the jacket sections 11 and 14 they are transported on barge 12 to the place of launching and location; otherwise if they were fabricated in one piece for towing or in sections for towing, excess buoyancy in the range from about 30 percent to about 40 percent would have to be provided to ensure stability and integrity of the structure.

The jacket sections 11 and 14 may have any desired number of legs, as for example, three legs, four legs (as illustrated herein) or eight legs and are provided with transverse and cross struts 15 and 16 and other bracing as necessary to provide rigidiy to the structure. The legs 20A (surface legs) and 20B (submerged legs) of both jacket sections 11 and 14 are at least in part hollow to provide buoyancy and a passageway for the piling used to anchor the unitized jacket to the ocean floor and for permitting man's access for purposes of welding the joint connecting the legs of the sections. The mating ends of the legs 20A and 20B at each section 11 and 14 are provided with connector flanges 22 which are to be bolted or otherwise connected together when the two sections are brought together.

Figure 2:
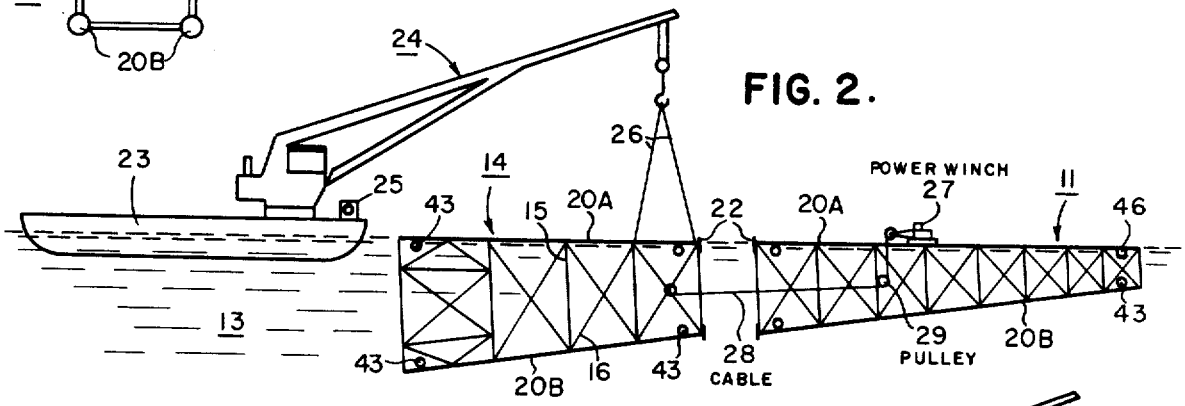
FIG. 2 illustrates the alignment of the two sections preparatory to connection or unitization.

Referring now to FIG. 2, a work barge 23 provided with a crane means 24 and an auxiliary power supply means 25 is moved on location and is operably connected to the lower section 14 by lift lines 26 for maneuvering the sections together. At this time a removable power winch means 27 is attached to the upper side structure of section 11 and by means of a cable 28 passing over a sheave or pulley 29 and attached to the lower section 14 as shown provides means for pulling the two sections together. A flexible power supply conduit (not shown) is then connected between the winch 27 and the power supply means 25 on barge 23.

A pre-alignment and latching means generally designated as 30 (see FIG. 5) is provided to align and latch the two sections together just prior to the mating engagement of the flange 22. Means 30 consists of a latch prong 31 attached to the structure of section 11 and a latching sleeve 32 (provided with a flared bell shaped opening 33) which is attached to the structure of section 14. As the two sections are brought together the prong 31 enters the sleeve 32 and correctly aligns the flanges 22. The prong is latched in the sleeve by a spring biased latch in housing 34. A means 30 may be positioned adjacent each of the legs 20A and 20B of the two sections; however, only two means 30 may be used if they are positioned on legs diagonally spaced apart.

The flanges 22 of upper section 11 are provided on their connecting surfaces with hard rubber gaskets 35 to protect the surface of the flange during engagement operations. Such gaskets may also be provided on the flanges of section 14 is desired and, apart from protection, also compensate for any slight misalignment. The flanges 22 are then bolted and welded together at each leg 20A and 20B to unitize the two sections 11 and 14 and provide a single jacket generally designated by the numeral 60. The power winch 27 maintains tension on cable 28 until all of the flanges 22 have been bolted and welded together.

Figure 5:
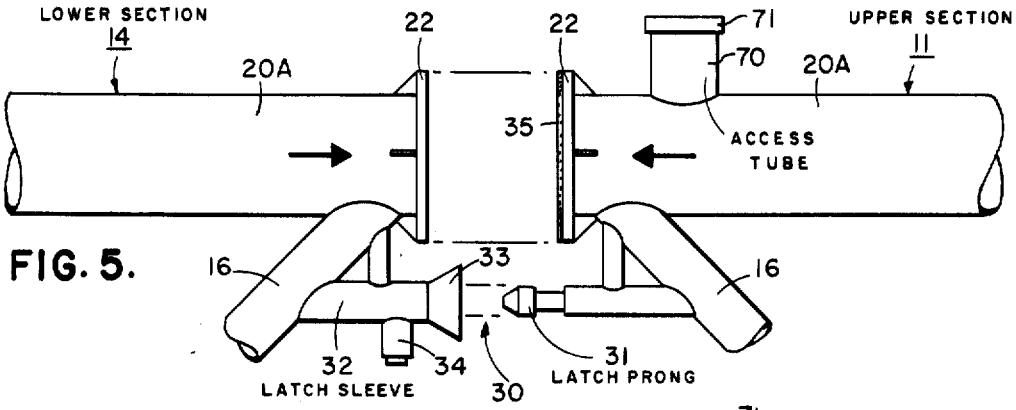
FIG. 5 is a detail of a quick connection means on each of the legs of the sections of the jacket shown on a surface leg.
Figure 6:
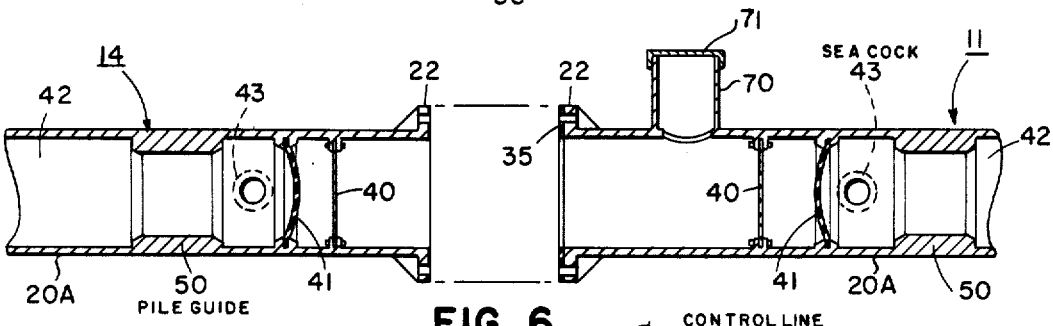
FIG. 6 is a detail of fixed connection means and sealing means in each leg of each jacket section for providing buoyancy.
Figure 5A:
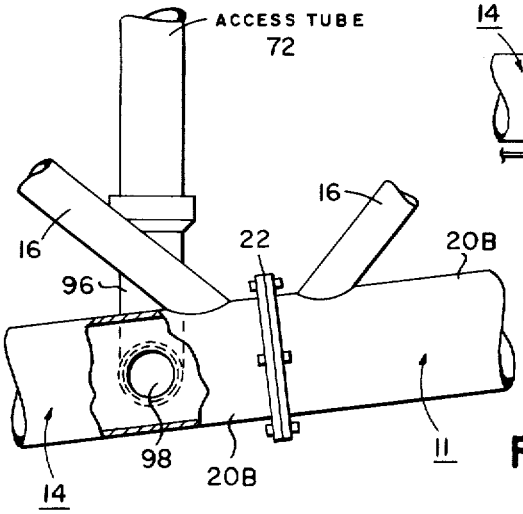
FIG. 5A shows an access tube connection into a submerged leg.

The surface leg 20A, as illustrated in FIG. 5, contains an access tube 70 connected into the upper section 11 to permit a welder access to the joint connecting the upper and lower sections to weld flanges 22 of those sections together. The access tube 70 is also shown in FIG. 6. A cap 71 for access tube 70 may be provided to prevent water or other matter from entering the legs through the access tube when no welding operations are being conducted. FIG. 5A shows a similar access tube 72 connected into submerged leg 20B adjacent flange 22 of lower section 14. Either access tubes 70 or 72 may be connected into the legs of either of the sections 11 or 14.

Figure 7:
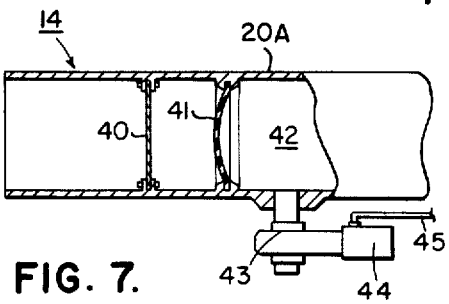
FIG. 7 is a detail of sea cocks for providing a flooding means.
Figure 8:
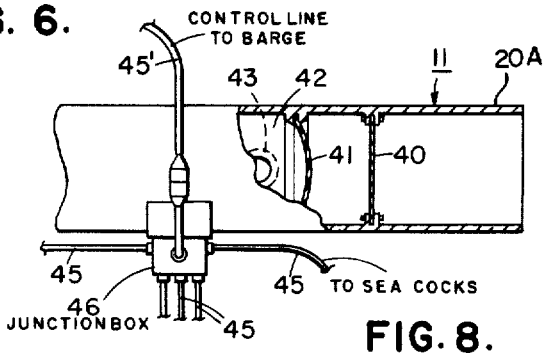
FIG. 8 is a detail of an upper end of one leg of a jacket section and a showing of a junction box for control of sea cocks.
Figure 9:
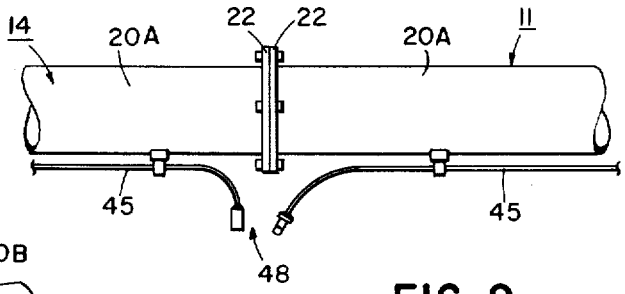
FIG. 9 shows a portion of the upper and lower sections connected together and means for connecting the control lines to the sea cocks.

Referring now to FIGS. 6, 7 and 8, it will be seen that the legs 20A and 20B of each of the sections 11 and 14 are each provided with two sets of diaphragms 40 and 41 adjacent both ends thereof. Diaphragm 40 may be constructed of plastic or other flexible material and is provided to afford buoyancy to the legs while diaphragm 41 may be constructed of any of a number of common construction materials and acts as a safety backup for diaphragm 40. Both diaphragms are flexible to some extent and are frangible or rupturable for purposes described hereinafter. The sets of diaphragms form a watertight compartment 42 in each of the legs of each of the sections. Connected to each end of the legs 20A and 20B and fluidly communicating with the chambers 42 are sea cocks 43 for admitting sea water into the compartments when desired. The sea cocks 43 are operated by motor means 44 which by fluid power lines 45 are each connected to a common junction box or manifold 46 which is attached to the upper end of one of the legs 20A of the upper section 11 as shown in FIG. 8. The lines 45 of the upper section 11 and those of the lower section are joined together by connector means 48, as shown in FIG. 9, after the two sections have been unitized. The sea cock at one end of compartment 42 acts as a flooding valve and the one at the other end as an air escape means. The legs may be divided into several compartments if desired with each provided with two sea cocks such as 43. The legs 20A and 20B of each section are provided with spaced apart centralizers means such as pile guides 50. Each section may have a door or doors (not shown) in each leg adjacent the flanges 22 through which a welder may enter to weld the flanges together from the interior of the legs 20A and 20B as will be explained in more detail with respect to FIGS. 10–15. The door may be previously formed or may be cut into legs 20A and 20B and then when welding is completed welded shut to close such entrances to legs 20A and 20B. Of course, water must be removed after the door is opened and the legs 20A and 20B kept free of water until deliberately flooded.

Figure 3:
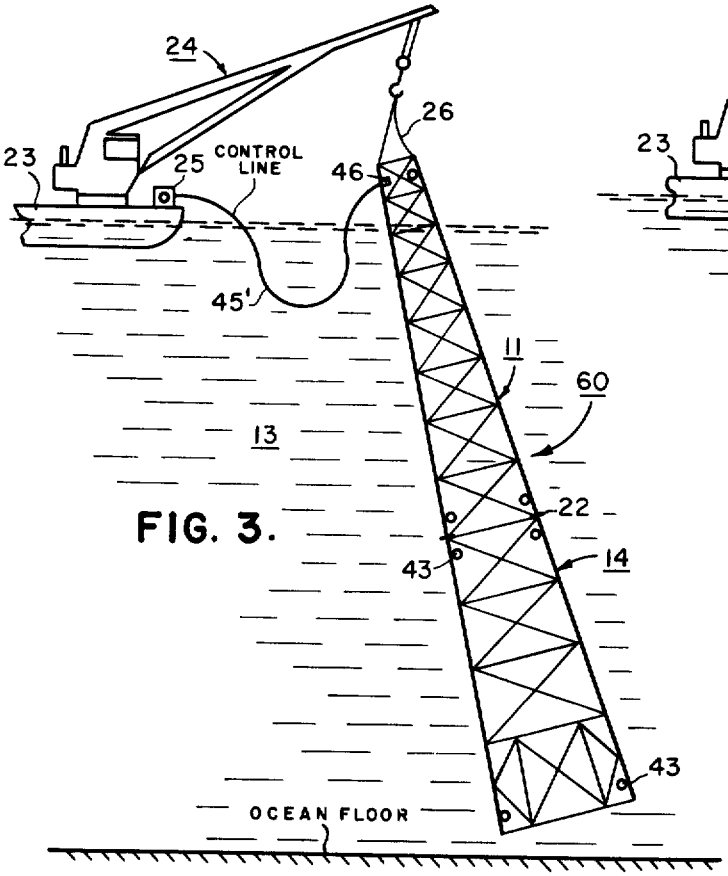
FIG. 3 shows the connected unitized sections being rotated and sunk.

The power winch 27 is now removed from the structure and a power conduit line 45' as shown in FIG. 3 is connected between the power source means 25 on barge 23 and the junction box or manifold means 46 on the upper end of structure 60.

The crane lines 26 are then connected to the upper end of the structure 60 and the assembly is now in position to begin flooding of the legs 20A and 20B.

Figure 4:
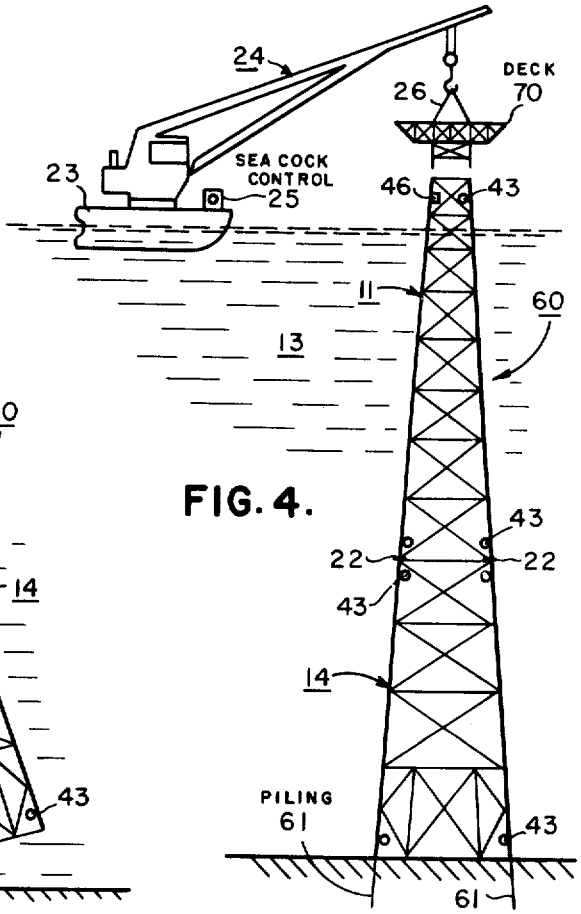
FIG. 4 illustrates the placement of a deck on the unitized structure after anchoring by driving piling through the legs into water bottom.

As the sea cocks are opened remotely from the barge 23 sea water enters the compartment 42 of legs 20A and 20B the jacket 60 rotates to the position shown in FIG. 3 with the upper end thereof controlled by the crane 24 so that it sinks gently to the ocean floor with the upper end of the structure extending above water as shown in FIG. 4. The extension distance above the water surface may be anywhere from about 10 to 100 feet as may be desired.

Piling 61 is then run in through each of the legs 20A and 20B of the structure and by means not shown is driven into the ocean floor a substantial depth to anchor the structure. As the piling is run through the legs, it ruptures and passes through the diaphragms 40 and 41. After the structure 60 has been anchored, a deck section 70 positioned by the crane 24 is connected to the upper end of the structure.

Referring to FIGS. 10 to 15, the two sections, 11 and 14, are launched and moved or pulled together as described with respect to FIGS. 1 and 2 (please note that the upper and lower sections shown in FIGS. 10 and 11 are reversed from the showings in FIGS. 1 and 2 and 5 to 9). Access tubes 70', each provided with a cap 71', are connected to surface legs 20A of lower section 14 and access tubes 72', each provided with a suitable cap 73', are connected into each of the submerged legs 20B of upper section 11. These tubes are connected into legs 20A and 20B near flanges 22 of those legs. Whether these tubes are located on the upper or lower sections is a matter of choice.

An alignment and latching, mating guide means generally designated 74 are mounted on each of the legs to be connected together in making up the sections. A guide member prong 75, shown connected by suitable support brackets 76 to surface leg 20A of lower section 14 is conically shaped and provided with latches 77. A guide member sleeve 80 shown connected by suitable support brackets 81 to surface leg 20A of upper section 11, is also formed of a conical shape for receiving guide prong 75 and is provided with latch openings 82 for engagement with latches 77. Similarly, a conically shaped guide member prong 85 provided with latches 87 is connected to each of the submerged legs 20B of section 14 by bracket 86 and a conically shaped guide sleeve 90 provided with suitable latch slots (not shown) is connected to each submerged leg 20B of upper section 11 by brackets 91. Guide prong 75 and guide sleeve 80 are longer than guide prongs 85 and guide sleeve 90. The differences in the sizes of the guide prongs on the surface legs and guide prongs on the submerged legs are to ensure that the submerged legs are properly aligned before engagement of guide prongs 85 in guide sleeves 90. Once guide prongs 75 are engaged in guide sleeves 80, the surface legs are properly aligned and the lower submerged legs are also generally aligned properly and final, precise alignment is achieved by the guide prongs 85 and guide sleeves 90.

FIG. 10 illustrates the upper and lower sections being brought together. FIG. 11 shows upper and lower sections engaged and fully made up. FIG. 12 shows the guide prongs and guide sleeves in more detail. The flanges 22 are the same as those previously described with respect to FIG. 5.

Figures 13, 14, 15:
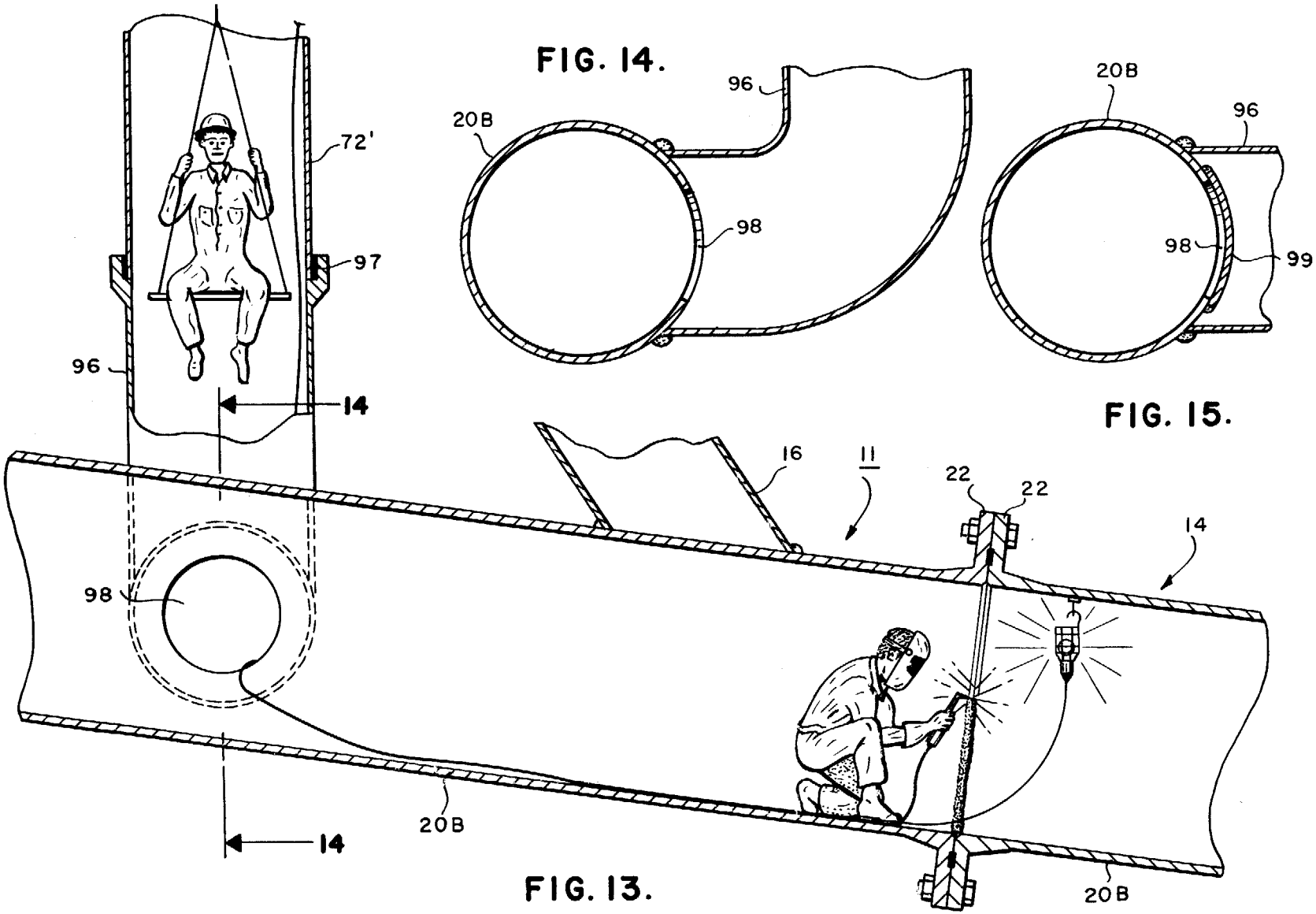

To facilitate connection of access tube 72' into legs 20B guides 95 are connected to cross struts 16 and to upper or surface legs 20A. Seating tubes 96 shown more clearly in FIG. 13 make a sealing connection at 97 with the lower end of access tubes 72' after they have been run in through guides 95. Seating tubes 96, as shown in FIGS. 14 and 15, are welded to the sumberged legs 20B. At the connection of tubes 96 and tubes 20B, manhole openings 98 are formed in tubes 20B.

In operation, after sections 11 and 14 are connected together and bolted to each other and properly sealed as described herein, water is pumped out of legs 20B. Then a welder, as illustrated in FIG. 13, is lowered through access tube 72' into leg 20B adjacent flanges 22 which are shown have been sealed and bolted together. The welder then welds the two sections of leg 20B together from the interior of the legs. All of the legs 20B are welded in that manner. As illustrated in FIG. 15, after the welding of the legs has been completed, the welder may then cover opening 98 with a plate 99 and weld the plate to sealingly close opening 88. If desired, access tube 72' may then be removed. Legs 20A are welded together in a similar manner. The welder is lowered into a leg 20A through access tube 70' and welds the two sections of leg 20A togehter from the interior of the legs. All of the legs 20B are welded in that manner.

Commercially available means other than bolts may be employed to secure the sections together in order to effect proper sealing of the sections prior to pumping out the water. Under some circumstances the guide prongs and guide sleeves alone, without bolts or other type connecting means, could achieve sufficient sealing of the sections to permit pumping out of water and welding.

Other changes and modifications may be made in the illustrative embodiments of the invention shown and/or described herein without departing from the scope of the invention as defined in the appended claims.

It will be clear from the foregoing description taken with the drawing that a new, useful, unobvious and therefore patentable result is obtained in unitizing and installing jackets to support offshore structures in waters of great depths.

The nature and objects of the present invention having been fully described and illustrated and the best mode and embodiment contemplated set forth, what we wish to claim as new and useful and secure by Letters Patent is:

1. A method of unitizing an offshore jacket for an offshore platform in water comprising:

fabricating an offshore jacket having at least three legs and at least two sections;

launching said sections into said water such that each is separately floating, each section having sufficient buoyancy to maintain at least one leg at the water's surface, the remaining leg or legs being submerged;

aligning the companion legs of said sections and drawing said sections together while floating said sections in said water;

guiding said surface legs on said sections into alignment prior to guiding said submerged legs on said sections into alignment to ensure proper alignment of said submerged legs.

[2. A method as recited in claim 1 in which the legs of said sections are connected together sealingly and welded together from the interior of said legs.]

[3. A method as recited in claim 2 in which said sections are bolted together from the exterior of said legs prior to welding said legs together.]

[4. A method as recited in claim 3 in which said welds made within the interior of said legs are accomplished by a welder entering the legs of said sections and moving to the habitat where the weld is to be made and making such weld.]

5. A method of unitizing an offshore jacket in deep water and for locating an offshore platform therein comprising:

fabricating an offshore jacket having at least three legs and at least two sections, said jacket legs when connected together and located in said water extending from water bottom to above water level;

launching said sections into said water such that each floats separately, each section having only sufficient buoyancy to maintain at least two legs at the water's surface; the remaining legs being submerged;

aligning the legs of said floating sections and drawing said floating sections together, said surface legs on said sections being aligned prior to alignment of the submerged legs;

securing said legs together; and sinking said connected sections by decreasing the buoyancy of said legs until said jacket is in an upright position resting on water bottom and extending above water level.

[6. A method as recited in claim 5 in which the legs of said sections are connected together sealingly and welded together from the interior of said legs.]

[7. A method as recited in claim 6 in which the legs of said sections are bolted together from the exterior of said sections.]

[8. A method as recited in claim 7 in which welders enter said legs adjacent the habitat of the connection of said legs to each other and then weld said legs together.]

9. A method as recited in claim 5 including driving piling through said legs to anchor said offshore jacket on water bottom.

[10. A method of unitizing an offshore jacket in water which comprises:

fabricating an offshore jacket having at least three legs and at least two sections;

launching said sections into the water such that each is separately floating, each section having sufficient buoyancy to maintain at least one leg at or above the water's surface, the remaining leg or legs being submerged;

aligning and drawing said floating sections together;

sealingly connecting companion legs of said sections together from the exterior of said legs;

pumping water from said connected legs; and welding the legs of said sections together from the interior of said legs including the submerged as well as the surface legs.]

[11. A method as recited in claim 10 in which a welder enters said legs to the habitat of the joint to be welded and welds said legs together from the interior thereof.]

[12. A method of unitizing an offshore jacket in deep water and for locating an offshore platform which comprises:

fabricating an offshore jacket having at least three legs and at least two sections;

floating each of said sections to a selected water location on at least one vessel;

launching said sections into the water such that each is separately floating, each section having sufficient buoyancy to maintain at least one leg at or above the water's surface, the remaining leg or legs being submerged;

aligning said sections and drawing said sections together;

sealingly connecting companion legs of said sections together from the exterior of said legs;

pumping water from said connected legs;

welding the legs of said sections together from the interior of said legs including the sumberged as well as the surface legs; and sinking said connected sections by decreasing the buoyancy of said legs until said jacket is in an upright position resting on water bottom and extending to above water level.]

[13. A method as recited in claim 12 in which said legs are welded together by a welder entering said legs and moving to the habitat where the legs are to be welded together and making such welds.]

[14. A method as recited in claim 12 including driving piling through said legs to anchor said offshore jacket on water bottom.]

*15. A method of unitizing an offshore jacket having at least three legs and at least two sections for forming an offshore platform in water comprising:*

*floating said sections in said water, each section having sufficient buoyancy to maintain at least one leg at the water's surface, the remaining leg or legs being completely submerged, and the ends of companion legs of said sections containing engageable and latchable guide means;*

*aligning and drawing said floating sections together until said guide means engage and latch; and then*

*sealingly connecting said companion legs of said sections together.*

*16. A method as recited in claim 15 including launching each of said sections from a floating vessel; and*

*after sealingly connecting the companion legs of said sections together, sinking said connected sections by*

*decreasing the buoyancy of said legs until said jacket is in an upright position on water bottom and extending to above sea level.*

*17. A method of unitizing an offshore jacket having at least three legs and at least two sections for forming an offshore platform in water comprising:*

*floating said sections in said water, each section having sufficient buoyancy to maintain at least two legs at or above the water's surface, the remaining leg or legs being submerged, the companion legs of said sections containing engageable guide means for guiding and aligning said companion legs; and*

*drawing said floating sections together until said guide means engage, said surface guide means engaging prior to engagement of said subsurface guide means to ensure proper alignment of said submerged legs.*

*18. A method as recited in claim 17 including: securing said legs together; and*

*sinking said connected sections by decreasing the buoyancy of said legs until said jacket is in an upright position resting on water bottom and extending above water level.*

*19. A method of unitizing an offshore jacket having at least four legs and at least two sections for forming an offshore platform in water which comprises:*

*floating each of said sections in said water, each section having sufficient buoyancy to maintain at least two legs at or above the water's surface, the remaining leg or legs being submerged, and the ends of companion legs of said sections containing engageable guide means for guiding and aligning said companion legs;*

*drawing said floating sections together until said guide means engage, said surface guide means engaging prior to engagement of said subsurface guide means; and then*

*sealingly connecting companion legs of said sections together.*

*20. A method as recited in claim 19 including launching each of said sections from a floating vessel; and*

*after sealingly connecting the companion legs of said sections together, sinking said connected sections by decreasing the buoyancy of said legs until said jacket is in an upright position on water bottom and extending to above sea level.*

*21. Apparatus for forming an offshore platform in water comprising:*

*a first floatable jacket section for said offshore platform having at least three hollow legs, said first section when floated in said water having sufficient positive buoyancy to maintain said first section in a horizontal position with at least two legs at or above the water's surface and the remaining leg or legs submerged;*

*a second floatable jacket section for said offshore platform having at least three hollow legs, said second section when floated in said water having sufficient positive buoyancy to maintain said second section in the horizontal position with at least two legs at or above the water's surface and the remaining leg or legs submerged, the companion legs of said jacket sections being connectable in said water; and*

*guide means arranged on the ends of the legs of said jacket sections capable of engaging to guide and align the companion legs of said sections when connecting said companion legs together, said guide means on said surface legs being longer than said guide means on said submerged legs and engaging to guide said surface legs into alignment prior to engagement of said guide means on said submerged legs when connecting said companion legs together.*

*22. Apparatus as recited in claim 21 including latching means on said guide means for latching the guide means of said companion legs together.*

*23. Apparatus as recited in claim 22 in which each guide means comprises a guide cone and guide funnel, said guide cone and guide funnel on said surface legs being longer than said guide cone and guide funnel on said submerged legs.*

* * * * *